United States Patent Office 3,228,993
Patented Jan. 11, 1966

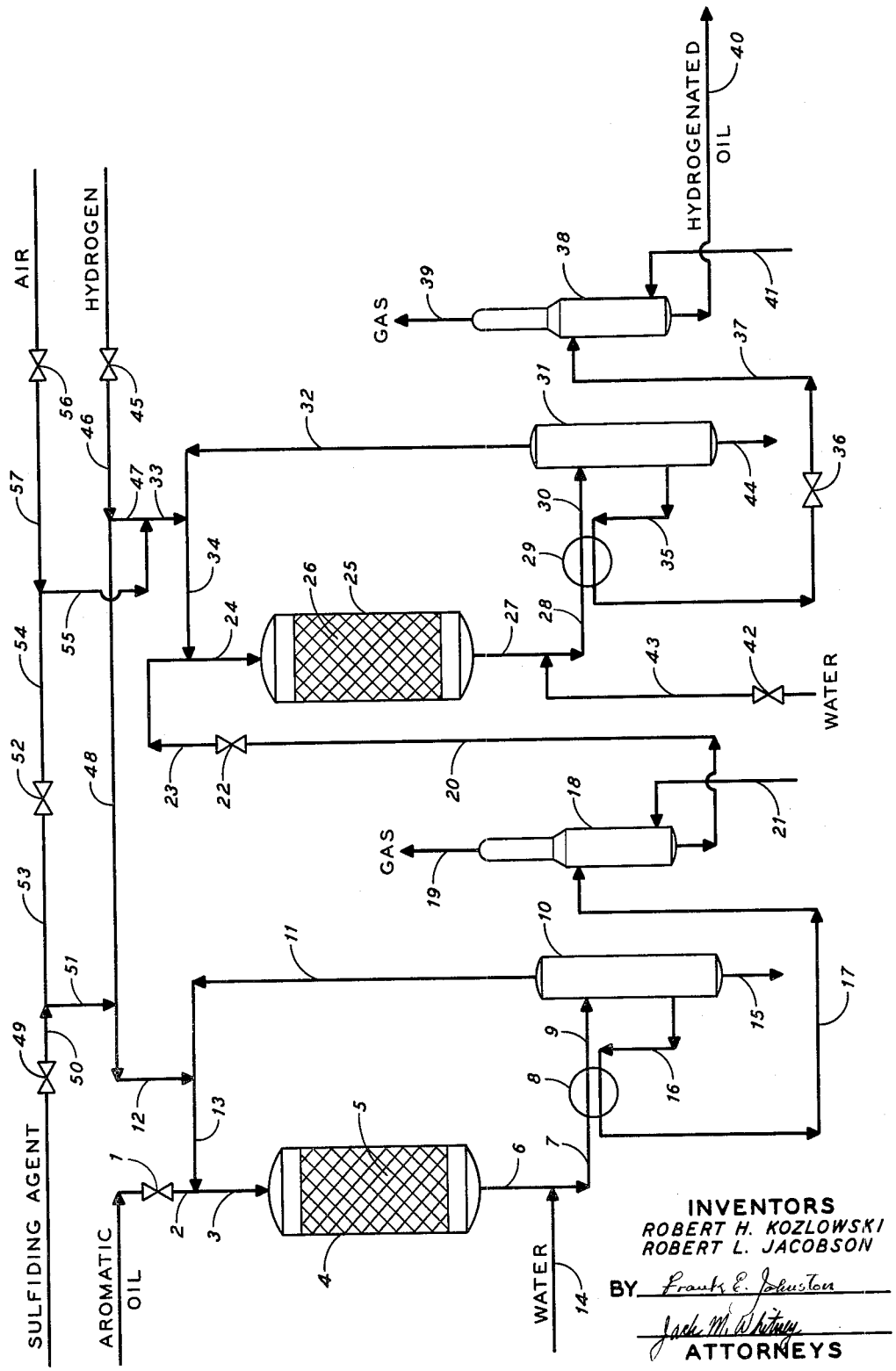

3,228,993
CATALYTIC HYDROGENATION PROCESS EMPLOYING A REDUCED NICKEL-MOLYBDENUM-ALUMINA CATALYST
Robert H. Kozlowski, Berkeley, and Robert L. Jacobson, Pinole, Calif., assignors to Chevron Research Company, a corporation of Delaware
Filed Aug. 23, 1962, Ser. No. 218,941
4 Claims. (Cl. 260—667)

This invention relates to catalytic hydrogenation process. More particularly, the invention relates to the catalytic hydrogenation of aromatic hydrocarbons contained in hydrocarbon oils. In a specific aspect, the invention relates to the removal of aromatics and nitrogen and sulfur compounds from hydrocarbon oils by catalytic hydrogenation in two stages.

Catalytic hydrogenation processes are well known and comprise contacting a hydrocarbon oil with a hydrogenation catalyst and excess hydrogen in a reaction zone at hydrogenation conditions. Hydrogenation conditions include temperatures of 300 to 800° F., pressures of above 200 p.s.i.g., especially 500 to 5000 p.s.i.g., hydrogen to oil ratios of above 500 standard cubic feet per barrel (s.c.f./bbl.), especially 1000 to 15,000 s.c.f./bbl., and flow rates of oil relative to catalyst of above 0.2 volume of oil per volume of catalyst per hour (LHSV), especially 0.4 to 15 LHSV. The process can be conducted in a number of ways, but probably the most convenient method is by passing a mixture of preheated oil and hydrogen through one or more fixed beds of catalyst particles contained within a reactor, separating the reactor effluent into hydrogenated oil and hydrogen-rich gas, recycling the hydrogen-rich gas to the reactor with added make-up hydrogen, and recovering the hydrogenated oil. The contacting of oil and catalyst can also be carried out in a slurry, in a fluidized-bed reactor, or in a fixed-bed reactor with countercurrent flow of oil and hydrogen. Multiple stages of contacting in one or more of the foregoing ways may be used. Whatever contacting scheme is employed, the success of the process depends on using an active catalyst.

An exemplary catalyst for the hydrogenation of aromatics is platinum on alumina. The activity of this catalyst is adversely affected by the presence of sulfur and nitrogen compounds. Accordingly, it has been proposed to remove sulfur and nitrogen compounds from hydrocarbon oils by hydrofining and then to hydrogenate aromatics in the sulfur- and nitrogen-free oil with a platinum-type catalyst. Such a processing scheme would be useful, for example, in the preparation of jet fuels, lubricating oils, and similar products wherein the presence of aromatic hydrocarbons has an adverse effect on the desired product properties. Since the platinum hydrogenation catalysts are very expensive, a large amount of capital outlay is required for a catalyst charge. Accidental damage to the catalyst during processing can be extremely costly. Accordingly, there is a definite need for a less expensive hydrogenation catalyst. Another disadvantage of the aforementioned combination hydrofining and platinum hydrogenation process is that the demand for such products is not yet sufficient to justify the installation of large-scale plants, and the unit costs per barrel of oil treated in a small-scale plant of that type are too high to be competitive with other methods, such as solvent extraction and distillation, for obtaining low aromatic-content fractions.

The present invention solves the above-mentioned problems by hydrogenating aromatics using certain new catalysts which resemble the conventional hydrofining catalysts superficially, but which, when reduced, have very nearly the same activity as a 0.5% platinum on alumina catalyst for the hydrogenation of aromatics, in the absence of sulfur compounds. The catalysts are considerably less expensive than the platinum-alumina catalyst, and they have other advantages. When sulfided, the new catalysts have remarkably high activity for the removal of nitrogen compounds and high activity for the removal of sulfur compounds by catalytic hydrogenation. Thus, the same catalyst can be used in both stages of a process comprising removing nitrogen and sulfur compounds from a hydrocarbon oil by catalytic hydrogenation in a first stage using the sulfided catalyst and then hydrogenating aromatic hydrocarbons in the nitrogen- and sulfur-free oil by catalytic hydrogenation in a second stage using the reduced catalyst. This same processing equipment can also be used to treat other hydrocarbon oils for purification without extensive hydrogenation of aromatics, without the necessity of shutting down to change catalysts, by sulfiding the catalyst in the second stage. Hence a large-scale versatile plant can be used, obtaining the benefits of low unit cost per barrel, in blocked operation for multiple purposes. Also, because of the unusual activity of the new catalysts, unit costs in a small-scale plant are less.

The conventional sulfactive hydrofining catalysts have only low activity for the hydrogenation of aromatics, a fact which has often been considered an advantage since these catalysts are often employed in the treatment of low-boiling naphthas which are to be catalytically reformed to prepare high octane gasolines. Conversely, the platinum hydrogenation catalysts have low activity for the removal of nitrogen and sulfur compounds. Hence, neither the hydrofining catalysts nor the platinum catalysts can be used economically in both stages of a two-stage process of the type described.

In accordance with one embodiment of the present invention, aromatic hydrocarbons are hydrogenated by contacting a hydrocarbon oil containing aromatics at hydrogenation conditions with a reduced porous oxide catalyst in a reaction zone from which sulfur compounds are essentially excluded. The reduced porous oxide catalyst is produced by treating a porous oxide catalyst consisting essentially of a combination of nickel, molybdenum, aluminum and oxygen in the composition ranges 5 to 13 weight percent NiO, 23 to 45 weight percent $MoO_3$, and the balance $Al_2O_3$, with hydrogen-containing gas at elevated temperature to convert the NiO and $MoO_3$ substantially to Ni and Mo. The use of such catalysts in the sulfided form for the hydrogenative removal of nitrogen compounds from hydrocarbon oils is the subject of our copending application Serial No. 90,382, filed February 20, 1961, now abandoned, a continuation-in-part of our prior copending application Serial No. 12,319, filed March 2, 1960, now U.S. Patent No. 3,114,701, both entitled, "Catalytic Hydrodenitrification Process."

In accordance with another embodiment of the present invention, a hydrocarbon oil containing aromatics and nitrogen and sulfur compounds is passed serially through first and second catalytic hydrogenation zones at hydrogenation conditions, each of which zones contains a porous oxide catalyst consisting essentially of a combination of nickel, molybdenum, aluminum and oxygen in the composition ranges 5 to 13 weight percent NiO, 23 to 45 weight percent $MoO_3$, and the balance $Al_2O_3$. In the first zone, the catalyst has been presulfided by treating with a sulfiding agent to convert the NiO and $MoO_3$ substantially to $Ni_3S_2$ and $MoS_2$. In the second zone the catalyst has been prereduced by treating with hydrogen-containing gas to convert the NiO and $MoO_3$ substantially to Ni and Mo. Ammonia and $H_2S$ are separated from the oil effluent of the first zone prior to passing said effluent through the second zone, and hydrocarbon oil containing substantially less aromatics and nitrogen and sulfur compounds is recovered as the oil effluent of said second zone.

Sulfur compounds are essentially excluded from the aromatics hydrogenation zone. That is to say, the sulfur content of the feed is to be less than 0.01 weight percent, preferably not greater than about 0.002 weight percent (20 p.p.m.). The reduced catalyst will pick up sulfur and its activity for hydrogenation of aromatics will decline as a result. Hence, the longest and most advantageous processing is obtained with the lowest sulfur contents in the feed. Superior results are obtained with sulfur contents below 10 p.p.m. The nitrogen content, similarly, preferably does not exceed 20 p.p.m. and is best reduced to below 10 p.p.m. in the feed to the aromatics hydrogenation zone.

After long contacting of hydrocarbon oil at hydrogenation conditions the catalyst in one or both zones may decline in activity, due either to a gradual accumulation of carbonaceous deposits on the catalysts or due to gradual sulfiding of the reduced catalyst by the small amount of sulfur not removed from the oil in the first zone. Usually this requires that more severe conditions of higher temperature or reduced throughput be used to obtain the desired hydrogenation. Either or both catalysts can be regenerated to restore them to their original activity by burning off the carbonaceous deposits and sulfur, converting the catalyst to the oxide form, and then again pretreating the catalyst so-oxidized to restore it to the desired sulfided or reduced state.

In another preferred embodiment of this invention, the above-described two-stage process is carried out for a time while treating a particular feed stock from which it is desired to remove aromatics, and the contacting of this hydrocarbon oil is then terminated. The catalyst in at least the second zone is then oxidized by treating with a combustion-supporting gas to convert the nickel and molybdenum substantially to NiO and $MoO_3$, and the catalyst so-oxidizing is then sulfided by treating with a sulfiding agent to convert the NiO and $MoO_3$ substantially to $Ni_3S_2$ and $MoS_2$. Another hydrocarbon oil containing aromatics and nitrogen and sulfur compounds from which it is not desired to remove aromatics extensively, is then passed serially through the first and second hydrogenation zones at hydrogenation conditions, and hydrocarbon oil containing substantially less nitrogen and sulfur compounds is recovered as the oil effluent of the second zone.

As shown in the description hereinafter, and in conjunction with the drawing, the invention provides by the use of certain catalyst compositions and pretreatments in certain sequences of process steps an improved process for hydrogenating aromatics in hydrocarbon oils and for purifying oils by removing nitrogen and sulfur compounds which has great flexibility for obtaining optimum conversion of raw materials to desired products at minimum investment and operating cost.

The attached drawing is a flow diagram illustrating apparatus suitable for carrying out the embodiments of the invention wherein two stages of contacting are used.

As shown in the drawing, the apparatus comprises in combination first and second high pressure hydrogenation reaction zones 4 and 25, each of which contains subdivided solid porous oxide catalyst consisting essentially of a combination of nickel, molybdenum, aluminum, and oxygen in the composition ranges 5–13 weight percent NiO, 23–45 weight percent $MoO_3$, and the balance $Al_2O_3$, as indicated by catalyst beds 5 and 26. The reaction zones are each constructed and operated for hydrogenating hydrocarbon oil with recycled hydrogen, and they are arranged, constructed, and operated for serial flow of hydrocarbon oil first through the first zone and then through the second zone. Thus, aromatic oil is introduced through valve 1 into line 2 and continues through line 3, with hydrogen introduced through line 13, through catalyst 5 contained in reactor 4 at suitable conditions of temperature, pressure, hydrogen throughput, and space velocity as previously described. Effluent oil and hydrogen is withdrawn through line 6 and passes through line 7, heat exchanger 8, wherein it is cooled, and line 9 to high pressure separator 10. At substantially the pressure of reaction zone 4 hydrogen-rich gas flashes off through line 11 and is recycled through line 13 with makeup hydrogen introduced through line 12.

Oil purification means are provided for preventing ammonia and hydrogen sulfide from passing from the first zone to the second zone. For example, water is introduced through line 14 to scrub out sulfides of ammonia. Acids or bases may also be added to neutralize excess $H_2S$ or ammonia, and the water phase is withdrawn from separator 10 through line 15. Purified oil is withdrawn from separator 10 through line 16 and passed through heat exchanger 8 for reheating prior to passing through line 17 to stripper 18. In stripper 18 any remaining ammonia and hydrogen sulfide is driven off through line 19, and oil substantially free of nitrogen and sulfur compounds is withdrawn through line 20. In a preferred embodiment of the invention, the pressure in stripper 18 is substantially that in reactor 4, and somewhat above that in reactor 25, so that repumping of the oil is not needed. The temperature in stripper 18 is then well above that in separator 10 to minimize solubility of $NH_3$ and $H_2S$. The temperature may approach that in reactor 4 if the oil is sufficiently heavy to prevent loss by vaporization. To assist in the purification a stripping gas such as hydrogen may be introduced through line 21. Lower temperature and pressure are used with volatile oils.

The oil in line 20 passes through valve 22 and lines 23 and 24, in admixture with hydrogen-rich gas added via line 34, through catalyst 26 in reactor 25. The effluent oil and hydrogen pass through lines 27 and 28, heat exchanger 29, and line 30 to high pressure separator 31. Here again hydrogen-rich gas is flashed off, withdrawn through line 32 and recycled with added hydrogen introduced by line 33 through line 34 to the reactor. Hydrogenated hydrocarbon oil is withdrawn from separator 31 through line 35, reheated in heat exchanger 29, and then passed through pressure reduction valve 36 and line 37 to low pressure separator 38, if the oil is not to be further processed at elevated pressure. In separator 38 any light gases are taken overhead through line 39, with the use of a stripping gas such as hydrogen introduced through line 41. Product hydrogenated oil is recovered through line 40. Makeup hydrogen is continuously added during the processing through valve 45 and lines 46, 47, 33, and 34 to the second reaction zone, and through lines 46, 48, 12, and 13 to the first reaction zone.

Means are provided for introducing a catalyst sulfiding agent into the first reaction zone without introducing the catalyst sulfiding agent into the second reaction zone, prior to starting up the process, when it is desired to effect hydrogenative removal of nitrogen and sulfur compounds in the first stage and aromatics hydrogenation in the second stage. Thus, for example, at startup valves 1 and 22 are closed as are valves 52 and 56. Hydrogen is introduced through valve 45 and circulated separately through the two reaction zones by means of the recycle hydrogen loops shown. Valve 49 is opened and a sulfiding agent such as $H_2S$ or an organic sulfur compound convertible to $H_2S$ by reaction with hydrogen, is passed through lines 50, 51, and 12 into the circulating hydrogen in the first reaction zone. The sulfiding agent is prevented from entering the second hydrogenation reaction zone by virtue of the fact that valve 52 is closed, valve 22 is closed, and there is an opposing pressure of hydrogen in line 48. As a result, the catalyst in reactor 4 is sulfided while the catalyst in reactor 25 is reduced. The process is then ready for use to hydrogenate aromatics and nitrogen and sulfur compounds contained in the aromatic oil by closing valve 49 and opening valves 1 and 22.

When it is desired to use the process primarily for the hydrogenative removal of nitrogen and sulfur compounds, without extensive hydrogenation of aromatics, valves 1, 22, and 45 are closed and at least that portion of the system beyond valve 22 is purged of hydrogen and hydrocarbons. Valve 56 is then opened and a combustion-supporting gas such as air or diluted air is introduced through line 57, passes through lines 55, 33, and 34 and is circulated through the second reaction zone to oxidize the catalyst in reactor 25 substantially to nickel oxide and molybdenum oxide. After the catalyst is completely oxidized, valve 56 is closed. Valves 49 and 52 are opened in order to effect sulfiding of the catalyst in reactor 25. The sulfiding agent passes through valve 49 and lines 50, 53, 54, 55, 33, and 34 into the second stage reaction zone. Unless pure $H_2S$ is used as the sulfiding agent, valve 45 is open to permit circulating hydrogen while sulfiding. Leakage of sulfiding agent into the first reaction zone is immaterial since the catalyst there is already sulfided. The process can then be used for the purification of hydrocarbon oil by the hydrogenative removal of nitrogen and sulfur compounds without extensive hydrogenation of aromatics by closing valve 49 and opening valves 1 and 22 and valve 45, if not already opened. It is then advantageous also to remove ammonia and hydrogen sulfide from the effluent of the second stage reaction zone by opening valve 42 to introduce water through line 43 into the effluent in line 27. Water containing dissolved $H_2S$ and ammonia is withdrawn from the high pressure separator 31 through line 44.

After a long period of use the catalyst in either or both reaction zones may become deactivated, usually by deposition thereon of carbonaceous deposits in the nature of coke. The catalyst can then be regenerated by burning off such deposits. Thus valves 1 and 45 are closed and the process is purged of hydrogen and hydrocarbons. Valve 56 is then opened and the combustion-supporting gas is passed through line 57 and split into portions which pass through lines 55 and 33 to the second reaction zone and through line 54, open valve 52, lines 53, 51, and 12 to the first reaction zone. It is ordinarily preferred to regenerate the reaction zones separately in this manner, with valve 22 being closed, and with the water of combustion being withdrawn through lines 15 and 44. Instead of adding water through lines 14 and 43, a caustic solution may be added to assist in the removal of sulfur oxides, carbon oxides, and water, which separates in separators 10 and 31.

It will be recognized by those skilled in the art that most of the conventional necessary equipment items such as control valves, pumps, compressors, furnaces, and heat exchangers have been omitted from the drawing for simplicity. For example, the feed in line 2 is usually preheated, and effluent in lines 9 and 30 will be further cooled.

The catalysts used in the process of this invention are to be distinguished from the conventional known hydrofining catalysts. Broadly, the conventional hydrofining catalysts comprise combinations of metals or compounds of metals of groups VI and VIII of the Periodic Table, unsupported or supported on a carrier such as alumina. The commercially available hydrofining catalysts are composed of relatively small amounts of molybdenum or tungsten, less than 15 weight percent of the catalyst, with relatively small amounts of cobalt or nickel of less than 4 weight percent of the catalyst, usually supported on a refractory porous oxide such as alumina or alumina containing a small amount of silica. It has been found that the low metal-content, supported, cobalt-molybdate catalysts have about the same activity as unsupported cobalt-molybdate. The same has also been found to be true of unsupported nickel-tungsten sulfide catalyst as compared to supported nickel-tungsten sulfide. Other investigations have indicated that metal content has little relationship to activity. Consequently, it has been considered well-established heretofore that it is best to use the least possible amount of the Group VI and Group VIII components in a supported hydrofining catalyst because the higher metal contents and the unsupported catalyst apparently offer no advantages and are more costly.

Contrary to the above, it has been found that certain high metal-content catalysts composed of nickel, molybdenum, and alumina have unusually high specific activity for certain reactions depending on the pretreatment of the catalysts. The porous oxide catalyst used in the process of this invention consists essentially of a combination of nickel, molybdenum, aluminum, and oxygen in the composition ranges 5–13 weight percent NiO (4–10% Ni), 23–45 weight percent $MoO_3$ (15.5–30% Mo), and the balance $Al_2O_3$. The composition is expressed in terms of metal oxides. It is believed, however, that the components are not actually entirely present as such separate oxides, but rather that in the particular composition range there is a combination of nickel, moylbdenum, and aluminum compounds which is the active species. The most active, hence preferred, porous oxide catalyst consists essentially of the aforementioned components in the composition ranges 7.6–10 weight percent NiO, 31–35 weight percent $MoO_3$, and the balance $Al_2O_3$. The weight ratio of nickel to molybdenum is preferably in the range from 0.2–0.5.

These catalysts may be prepared by well-known methods designed to produce porous, high-area, catalysts of low density. Probably the most convenient method is to impregnate a preformed activated alumina carrier with nickel and molybdenum compounds convertible to the oxides by calcination, and then calcining. Higher activities are obtained if nickel is impregnated first, converted to the oxide by calcination, and the molybdenum is then impregnated in two steps with calcining after each impregnation to convert the molybdenum compound to moylbdenum oxide. The catalyst can also be prepared by coprecipitating simultaneously compounds of nickel, molybdenum, and aluminum convertible to the oxides by calcination. In another method, two of the components, for example, molybdenum and aluminum, may be coprecipitated and the other component then impregnated on the calcined coprecipitate. Calcinations should be effected at temperatures below 1200° F. to avoid sintering the high metal-content catalyst, preferably between 700 and 1100° F., especially in the neighborhood of 900° F. for maximum activity and stability.

The finished porous oxide catalyst should have a pore volume of at least 0.1 cc. per gram, a surface area by nitrogen adsorption (B.E.T. method) of at least 25 square meters per gram, and a bulk density below 100 lbs. per cubic foot. These properties can be readily achieved by judicious selection of the starting materials and by careful drying and calcining to avoid sintering.

The reduced porous oxide catalysts of this invention is produced by treating the above described porous oxide catalyst with sufficient hydrogen-containing reducing gas, at elevated temperatures, to convert the NiO and $MoO_3$ substantially to Ni and Mo. As mentioned, it is not known that the components are originally present as NiO and $MoO_3$, but it can be shown that the weight loss during reduction corresponds closely to the removal of oxygen equivalent to that which would be evolved if the nickel and molybdenum were present as NiO and $MoO_3$ and were reduced to Ni and Mo. There is evidence, however, that a portion of the molybdenum is reduced only to $MoO_2$. It is best to effect the reduction by treating the catalyst with a flowing stream of hydrogen-containing gas in order to carry off the water formed. The reduction is accelerated by using an elevated temperature of above about 500° F., but the temperature is preferably not above 950° F., to avoid damaging the catalyst. The best way we have found to effect the reduction is as a preliminary step in the startup of the hydrogenation process. Thus, the porous oxide catalyst is loaded into the reaction zone. Hydrogen pressure is established, and the hydrogen is circulated while raising its temperature up to hydrogenation reaction conditions before introducing the hydrocarbon oil. Water formed is removed from the circulating hydrogen. It is found that the catalyst can be adequately reduced during this hydrogen circulation and heatup period without unduly extending the normal process startup time. Another reason for reducing in this manner, and avoiding temperatures above 950° F., is that the reduction is exothermic and may proceed too rapidly with the development of hot spots, due to the high metal content, if the temperatures are not kept low. High purity manufactured hydrogen is the preferred reducing gas, but low purity byproduct hydrogen may be used if free of sulfur. Gross water and condensible hydrocarbons should be excluded from the gas.

The sulfided porous oxide catalysts are produced by treating the porous oxide catalyst described previously with sufficient sulfiding agent such as a vaporized sulfiding agent selected from the group consisting of $H_2S$, mixtures of $H_2$, and mixtures of $H_2$ with organic sulfur compounds convertible to $H_2S$ by reaction with $H_2$, preferably at tempertures below 750° F., to convert the NiO and $MoO_3$ substantially to $Ni_3S_2$ and $MoS_2$.

As disclosed in our aforementioned copending applications, the sulfiding is also conveniently carried out as a part of the startup procedure with a fresh catalyst. To obtain the specific activity of the sulfided catalyst for hydrogenation removal of nitrogen compounds, however, it is important to avoid reducing the porous oxide catalyst while sulfiding. Hence, the oxide catalyst may be loaded into the reactor, hydrogen pressure established, and hydrogen circulated while heating up. However, the sulfiding agent should be introduced before the oxide catalyst has been exposed to a temperature above 750° F., and especially should be introduced when the temperature has reached about 400–550° F., before any significant reduction has occurred. If the porous oxide catalyst has been reduced to produce the reduced porous oxide catalyst, and it is desired to produce the sulfided porous oxide catalyst, the reduced catalyst should first be reoxidized prior to sulfiding.

To oxidize the catalyst a combustion-supporting gas such as diluted air is passed in contact with the catalyst at a maximum catalyst temperature below 950° F. Superior results are obtained if dry nitrogen-air, or flue gas-air, of low oxygen content is used at maximum temperatures preferably below 850° F. and still more preferably below 750° F. Oxidation will proceed slowly at room temperature, but for speed and control a minimum temperature of 500–550° F. is preferably used, especially if there are coke deposits on the catalyst. Elevated pressure is advantageously used during the oxidation step as well as during the sulfiding and reduction steps.

The sulfided porous oxide catalyst and the reduced porous oxide catalysts of this invention are surprisingly different in acivity from the hydrofining catalysts they most closely resemble in composition. The sulfided porous oxide catalysts are several times as active for the hydrogenative removal of nitrogen compounds from hydrocarbon oils as compared to known hydrofining catalysts. The reduced porous oxide catalysts are several times as active for hydrogenation of aromatic hydrocarbons as compared to hydrofining catalysts, to the extent that they more closely resemble the platinum-alumina hydrogenation catalysts in this respect than they do the hydrofining catalysts.

Thus, in the case of the porous oxide catalysts consisting essentially of nickel, molybdenum, aluminum, and oxygen in the composition ranges 5–13 weight percent NiO, 23–45 weight percent $MoO_3$, and the balance $Al_2O_3$, the pretreatment of the catalyst prior to use in the process is critically related to the type of reaction selectively promoted. This is in distinct contrast to the conventional hydrofining catalysts, where the pretreatment is not critical. Hydrofining catalysts behave about the same, whether presulfided, prereduced, or used as oxides.

The following examples demonstrate the abovementioned surprising contrasts in the properties of the catalysts of this invention as compared to conventional hydrofining catalysts and illustrate the manner in which these unusual properties are utilized in the process of this invention. The first example illustrates the preparation of a porous oxide catalyst such as is used in this invention and compares its composition with that of several commercially available catalysts.

EXAMPLE 1

A porous oxide catalyst was prepared by impregnating ⅛″ purchased alumina extrusions with a solution of nickel nitrate containing 11% nickel, drying at 200° F. and calcining at 900° F.; then impregnating with an aqueous solution of ammonium molybdate containing 20% molybdenum, drying at about 200° F. and calcining at 900° F.; then again impregnating with the aqueous solution of ammonium molybdate containing 20% molybdenum, drying at about 200° F. and calcining at 900° F. This catalyst, hereinafter referred to as catalyst X, had a pore volume of 0.33 cc./g., surface area of 110 m.²/g., and bulk density of 0.85 g./cc. Its composition is compared in the following Table I with several commercially available catalysts.

*Table I*

| Catalyst | Designation | Analysis | | | | | |
|---|---|---|---|---|---|---|---|
| | | NiO | CoO | Pt | MoO₃ | WO₃ | Al₂O₃ |
| X | Example 1 | 8 | | | 31 | | 61 |
| N | Commercial Co-Mo | | 3.5 | | 12.5 | | 84 |
| S | Commercial Co-Mo | | 3.5 | | 10 | | 86.5 |
| U | Commercial Ni-Co-Mo | 4.8 | 0.13 | | 16.5 | | 78.6 |
| B | Commercial Ni-W | 4.7 | | | | 28 | 67.3 |
| P | Commercial Pt | | | 0.5 | | | 99.5 |

In the following Examples 2 and 3, catalyst X is compared with various of the other catalysts in a process for the hydrogenation of aromatics contained in a kerosene boiling range distillate to prepare jet fuel. The feed was free of nitrogen and sulfur compounds in Example 2 while in Example 3 the effect of added sulfur on the hydrogenation activity is shown. In these examples the feed was a synthetic kerosene produced by hydrocracking heavier distillates, and boiled from 350 to 500° F. The feed contained less than 1 p.p.m. nitrogen and less than 1 p.p.m. sulfur.

EXAMPLE 2

Catalysts X, N, U, and P were installed in separate tubes in a multiple tube laboratory catalytic reactor having a common feed supply and preheat system. The catalysts were all prereduced prior to contacting the oil by treating with circulating hydrogen for 24 hours, at at 600° F. and 800 p.s.i.g. The nitrogen- and sulfur-free kerosene in admixture with 4000 standard cubic feet of hydrogen per barrel was passed through each catalyst bed at a pressure of 800 p.s.i.g., inlet temperature of 370° F., and at a liquid hourly space velocity based on the oil of 3.2 volumes of oil per volume of catalyst per hour. The results of this hydrogenation are shown in the following Table II.

When a catalyst having essentially the same composition as catalyst X was presulfided and then used to hydrogenate an Arabian kerosene boiling from 378 to 528° F. and containing 0.44% sulfur, by contacting at 650° F., 800 p.s.i.g., 0.5 LHSV, and 4000 s.c.f. $H_2$/bbl., the product was an improved jet fuel, as shown in Table IV.

*Table II*

| Inspections | Feed synthetic kerosene | Product using reduced catalyst | | | |
|---|---|---|---|---|---|
| | | N(Co-Mo) | U(Ni-Co-Mo) | P | X(Ni-Mo) |
| Gravity, °API | 40 | 40 | 40 | 42 | 42 |
| Aniline point, °F | 128 | 128 | 129 | 146 | 151 |
| Aromatics, percent (F.I.A.M. method) | 22 | 22 | 21 | 8 | 6 |
| Smoke point, mm. (ASTM method) | 17 | 17 | 18 | 24 | 25 |

The above data show that the conventional hydrofining catalysts, when prereduced, have very low activity for hydrogenation of aromatics; but the reduced porous oxide catalyst of this invention is extremely active for the hydrogenation of aromatics, even more so than the platinum on alumina catalyst.

The following Example 3 shows the effect of sulfur compounds on the hydrogenation activity of the reduced catalysts.

EXAMPLE 3

In a continuation of the run described in Example 2, the same feed was passed through the catalysts with the addition thereto of 0.5 weight percent sulfur as dimethyldisulfide. At the reaction conditions the dimethyldisulfide is converted to $H_2S$. All of the catalysts were reduced in activity by the presence of the sulfur to an extent such that measureable hydrogenation was not observed. Accordingly, the contacting conditions were adjusted to 650° F. and 1 LHSV at 800 p.s.i.g. The results obtained are shown in the following Table III.

*Table IV*

| Inspections | Feed, Arabian kerosene | Product using Presulfided catalyst |
|---|---|---|
| Gravity, °API | 42 | 44.7 |
| Aniline point, °F | 153 | 168 |
| Smoke point, mm | 21 | 31 |
| Aromatics, percent | 22 | 11.5 |
| Sulfur, percent | 0.44 | |
| Naphthalenes, vol. percent * | 4.3 | 0.15 |

*Pratt and Whitney.

*Table V*

| Inspections | Feed straight run kerosene | Product using sulfided catalyst | | | |
|---|---|---|---|---|---|
| | | S*(Co-Mo) | U(Ni-Co-Mo) | B(Ni-W) | X(Ni-Mo) |
| Gravity, °API | 44.6 | 45.2 | 45.8 | 45.7 | 46 |
| Aromatics, percent | 18.4 | 16.6 | 15 | 14.2 | 12.7 |
| Smoke point, mm | 23.5 | 24.5 | 26 | 25.5 | 27.5 |
| Sulfur, p.p.m | †0.3 | 9 | 3 | 1 | 4 |

*Not presulfided.
†Wt. percent.

Table V presents the results obtained when a straight run kerosene boiling from 336° F. to 482° F. was contacted with catalyst X and various of the commercial hydrofining catalysts, in the sulfided form, at hydrogenation conditions of 650° F., 840 p.s.i.g., 2 LHSV, and 2500 s.c.f. $H_2$/bbl., to compare their usefulness for improving jet fuel properties. The catalysts were presulfided prior to contacting the sulfur-containing kerosene, with the exception of catalyst S, which was used as supplied in accordance with the manufacturer's recommendation.

*Table III*

| Inspections | Feed Synthetic kerosene plus 0.5% S | Product using reduced catalyst | | | |
|---|---|---|---|---|---|
| | | N(Co-Mo) | U(Ni-Co-Mo) | P(Pt) | X(Ni-Mo) |
| Gravity, °API | 40 | 40 | 40 | 40 | 40 |
| Aniline point, °F | 128 | 129 | 131 | 133 | 133 |
| Aromatics, percent | 22 | 21 | 19 | 18 | 18 |

The above data shows that the presence of a substantial amount of sulfur in the reaction zone decreases the activity of the reduced porous oxide catalyst, and that of the platinum catalyst, to the extent that they are only slightly superior to the conventional hydrofining catalysts. It will be noted that the catalysts were not presulfided, the sulfur being added with the feed in the above example. Surprisingly, better results are obtained if the porous oxide catalyst is presulfided.

The product obtained using the presulfided catalyst X is a superior jet fuel because of its higher smoke point and lower aromatics content. Comparison of the data of Table V with that of Table III shows that it made little difference whether the catalysts U, S, or N were presulfided or not. The data of Table V also show that the sulfided catalysts are all approximately equal with respect to activity for hydrodesulfurization. Yet, as shown in the aforementioned copending applications, it is surprisingly found that the sulfided porous oxide catalysts of the invention have much greater activity for the hydrogenative removal of nitrogen compounds as compared to any of the other catalysts. The following Table VI presents the comparative relative activities of sulfided catalysts, for the hydrogenative removal of nitrogen compounds, based on first order reaction kinetics. Also shown is the nitrogen content of the product which is obtained when a light cycle oil boiling from 400° F. to 600° F. an containing 775 p.p.m. nitrogen is contacted with the catalysts at 620° F., 800 p.s.i.g., and 1 LHSV, with 4000 s.c.f. $H_2$/bbl.

The following example illustrates similar treatment of a cracked heavy naphtha.

EXAMPLE 5

A cracked heavy naphtha was hydrofined to produce a hydrofined cracked naphtha boiling from 370° F. to 450° F. and containing less than 1 p.p.m. nitrogen and less than 10 p.p.m. sulfur. The hydrofined naphtha was then contacted with reduced catalyst X and various of the other catalysts of Table I at 450° F., 800 p.s.i.g., 3 LHSV and 4000 s.c.f. $H_2$/bbl. Results obtained are shown in the following Table VIII.

Table VIII

| Inspections | Hydrofined cracked naphtha | Hydrogenated product using reduced catalyst | | | |
|---|---|---|---|---|---|
| | | N(Co-Mo) | U(Ni-Co-Mo) | P(Pt) | X(Ni-Mo) |
| Gravity, °API | 37 | 37 | 37 | 43 | 42 |
| Aniline point, °F | 88 | 88 | 88 | 145 | 141 |
| Aromatics, percent | 44 | 44 | 43 | 7 | 7 |
| Smoke point, mm. (ASTM method) | 10 | 10 | 11 | 22 | 22 |

Table VI

| Sulfided catalyst | Relative activity for nitrogen removal | Product nitrogen content |
|---|---|---|
| X (Ni-Mo) | 4 | 1 p.p.m. |
| N (Co-Mo) | 1 | 140-160 |
| U (Ni-Co-Mo) | 0.9 | 160-180 |
| B (Ni-W) | 1.5 | 60-65 |

The following example illustrates the manner in which the invention can be used to remove aromatics and nitrogen compounds from hydrocarbon oils containing large amounts of both components.

EXAMPLE 4

Nitrogen compounds were removed from the catalytically cracked light cycle oil just described by catalytic hydrogenation to produce a hydrofined feed having the inspections shown in Table VII. Aromatics in the hydrofined feed were then hydrogenated by contacting this oil in a second stage with the reduced porous oxide catalyst of this invention. As mentioned, the hydrofined light cycle oil containing 1 p.p.m. nitrogen can be obtained by contacting the light cycle oil with sulfided catalyst X at 620°, 800 p.s.i.g. 1 LHSV, and 4000 s.c.f. $H_2$/bbl., and removing the resulting $HN_3$ and $H_2S$. To obtain this low nitrogen level with any of the commercial hydrofining catalysts at this temperature and pressure requires the use of from three to four times the reactor and catalyst volume. The hydrogenated product shown in Table VII was obtained by contacting the hydrofined light cycle oil at hydrogenation conditions at 500° F., 800 p.s.i.g., 3.3 LHSV, and 4000 s.c.f. $H_2$/bbl. with reduced catalyst X. When the hydrofined light cycle oil containing 1 p.p.m. nitrogen was contacted with the reduced catalysts N and U at the same conditions, the aromatics were not significantly hydrogenated, as the product contained 53% aromatics.

Table VII

| Inspections | Light cycle oil feed | Hydrofined L.C.O. | Hydrogenated product |
|---|---|---|---|
| Gravity, °API | 25.5 | 30.5 | 35.5 |
| Aniline point, °F | 75 | 89 | 140 |
| Aromatics, percent | *55 | 54 | 14 |
| Sulfur, p.p.m | | <20 | |
| Nitrogen, p.p.m | 775 | 1 | |

*Estimated.

From the foregoing it is apparent that surprising benefits are obtained by using the porous oxide catalysts of this invention in both stages of a two-stage process comprising removing nitrogen and sulfur compounds in a first-stage by catalytic hydrogenation with the sulfided porous oxide catalyst and then hydrogenating aromatics in the nitrogen and sulfur-free effluent of the first stage by contacting in a second stage with the reduced porous oxide catalyst. Conventional hydrofining catalysts could not be used effectively in the second stage because they have such a low hydrogenation activity. Simiarly, the platinum catalyst is not suited to use in the first stage because it has low activity for the removal of nitrogen and sulfur compounds.

In accordance with a preferred embodiment of this invention, the same apparatus used in the two-stage process described in Examples 4 and 5 can also be used primarily for removing nitrogen and sulfur compounds from hydrocarbon oils without removing aromatics to a very great extent by oxidizing the reduced catalyst in the second stage and then sulfiding it. The process can then be used to process other oils with improved results, as in the following example.

EXAMPLE 6

A straight run middle distillate boiling from 380° F. to 666° F. having a gravity of 32.7° API and containing 1.0% sulfur and 645 p.p.m. nitrogen was contacted with the sulfided porous oxide catalyst X at 800 p.s.i.g., 680° F., 1 LHSV, and 1000 s.c.f. $H_2$/bbl. Ammonia and $H_2S$ were separated from the contacted oil yielding a product containing 78 p.p.m. nitrogen and 0.01 weight percent sulfur. When the oil containing 78 p.p.m. nitrogen is contacted with the sulfided catalyst X in a second stage at 680° F., 800 p.s.i.g., 3 LHSV, and 1000 s.c.f. $H_2$/bbl., the product will contain less than 10 p.p.m. nitrogen. The product has excellent color and color stability and is a very good stove oil. If the same total amount of the catalyst were installed in a single reactor, and the contacting of the middle distillate carried out in one stage at the same temperature and pressure and hydrogen rate, the product would contain 40 p.p.m. nitrogen.

Thus, in the practice of this invention the same processing equipment can be used during one time interval such as the winter months in accordance with Example 6 to produce high-quality fuel oils when these are in great demand, and can be used during another time interval such as the summer months in accordance with Example 4 or 5 to produce low aromatic content turbine fuels when these are in great demand, simply by changing the pretreatment of the catalyst in the second stage, and surprisingly improved results are obtained in both types of operation.

We claim:
1. The process which comprises (1) passing an aromatic hydrocarbon oil feed essentially free of sulfur contaminants through a reaction zone containing a reduced nickel-molybdenum-alumina catalyst, at hydrogenation conditions, and recovering product oil containing substantially less aromatics; then (2) sulfiding the catalyst; and then (3) passing an aromatic hydrocarbon oil feed containing sulfur and nitrogen contaminants through said reaction zone containing the sulfided nickel-molybdenum-alumina catalyst, at hydrogenation conditions, and recovering product oil containing substantially less sulfur and nitrogen compounds; said catalyst having a composition in the ranges 5-13 weight percent NiO, 23-45 weight percent $MoO_3$, and the balance $Al_2O_3$ when in the oxide form.

2. The process of claim 1 wherein said catalyst is sulfided in step (2) by treating the reduced catalyst with a combustion-supporting gas to convert the nickel and molybdenum substantially to NiO and $MoO_3$ and then treating the oxidized catalyst with a sulfiding agent to convert the NiO and $MoO_3$ substantially to $Ni_3S_2$ and $MoS_2$.

3. The process of claim 1 in combination with the additional steps of: (4) oxidizing the sulfided catalyst by treating with a combustion-supporting gas and then reducing the oxidizing catalyst by treating with a hydrogen-containing reducing gas; and then (5) passing an aromatic hydrocarbon oil feed essentially free of sulfur contaminants through said reaction zone containing the reduced catalyst, at hydrogenation conditions, and recovering product oil containing substantially less aromatics.

4. The process of claim 1 wherein a clean-burning jet fuel is recovered as the product of treating the oil feed with the reduced catalyst, and a high quality stove oil is recovered as the product of treating the oil feed with the sulfided catalyst.

References Cited by the Examiner
UNITED STATES PATENTS

| | | | |
|---|---|---|---|
| 2,744,052 | 5/1956 | Nozaki | 260—667 |
| 3,077,733 | 2/1963 | Axe et al. | 260—667 |
| 3,094,480 | 6/1963 | Richardson | 208—216 |

DELBERT E. GANTZ, *Primary Examiner.*

ALPHONSO D. SULLIVAN, *Examiner.*